US009296076B2

(12) United States Patent
Soto Martinez et al.

(10) Patent No.: US 9,296,076 B2
(45) Date of Patent: Mar. 29, 2016

(54) RIVETING DEVICE FOR AIRCRAFT FUSELAGES

(71) Applicant: Airbus Operations S.L., Madrid (ES)

(72) Inventors: Jorge Juan Soto Martinez, Madrid (ES); Juan Francisco Garcia Amado, San Fernando (ES); Marta Gimenez Olazabal, San Sebastian (ES); Jose Gorrotxategi Txurruka, Eibar (ES); Jokin Lekunberri Urkidi, Eibar (ES); Jon Ander Altamira Ugarte, Lasarte-Oria (ES)

(73) Assignee: Airbus Operations S.L., Madrid (ES)

( * ) Notice: Subject to any disclaimer, the term of this patent is extended or adjusted under 35 U.S.C. 154(b) by 332 days.

(21) Appl. No.: 13/771,379

(22) Filed: Feb. 20, 2013

(65) Prior Publication Data

US 2013/0212883 A1 Aug. 22, 2013

(30) Foreign Application Priority Data

Feb. 20, 2012 (EP) .................................. 12382056

(51) Int. Cl.
*B23P 15/28* (2006.01)
*B21J 15/14* (2006.01)
(Continued)

(52) U.S. Cl.
CPC .............. *B23P 19/06* (2013.01); *B21J 15/022* (2013.01); *B21J 15/142* (2013.01); *B21J 15/32* (2013.01);
(Continued)

(58) Field of Classification Search
CPC ...... B23P 19/06; B23P 19/005; B23P 19/001; B23P 19/006; B23P 19/04; B25J 11/005; B25J 15/0019; B25J 11/007; B25J 13/00; B25J 13/08; B25J 13/086; B25J 9/1697; B25J 19/0058; B21J 15/142; B21J 15/022; B21J 15/28; B21J 15/32; B21J 11/005; B25B 21/002; B25B 23/1415; B25B 1/04; B64F 5/0009; Y10T 29/49622; Y10T 29/53774; Y10T 29/53991; Y10T 29/53039; Y10T 29/53078; Y10T 29/53087; Y10T 29/53091; Y10T 29/53096; Y10T 29/49908; Y10T 29/49943; Y10T 29/49956; Y10T 29/5377; Y10T 29/53709; Y10T 29/49947; Y10T 29/49948; Y10T 29/49826; F16B 31/021; G05B 2219/45088; G05B 2219/45126; B21D 26/00; B23Q 1/25; B23Q 3/00; B23Q 5/00; B23Q 16/00
See application file for complete search history.

(56) References Cited

U.S. PATENT DOCUMENTS 4,538,483 A 9/1985 BAtten
4,611,377 A * 9/1986 McCormick et al. ...... 29/407.05
(Continued)

FOREIGN PATENT DOCUMENTS

EP 2275225 1/2011

OTHER PUBLICATIONS

European Search Report, Aug. 8, 2012.

*Primary Examiner* — Sarang Afzali
(74) *Attorney, Agent, or Firm* — Greer, Burns & Crain Ltd.

(57) ABSTRACT

A head of a riveting device—for Hi-Lite type rivets—of at least two components of a structure for installing automatically collars on pins previously inserted in the structure. The head comprises: a collar installation tool; a collar supply to supply collars to the collar installation tool; a tool actuating device; a linear displacement device to linearly move the tool during the threading operation; a withdrawal device arranged to withdraw the second part of the collars; a control arrangement configured to automatically perform the installation of collars on pins and after this the withdrawal of the second part of the collars, using tools and collars appropriate for the pins. Also a robot having as end-effector the head and to a method of riveting two components of an aircraft fuselage are provided.

12 Claims, 3 Drawing Sheets

(51) Int. Cl.

| | | |
|---|---|---|
| *B23P 19/06* | (2006.01) | |
| *B25B 21/00* | (2006.01) | |
| *B25B 23/14* | (2006.01) | |
| *B64F 5/00* | (2006.01) | |
| *B25J 15/00* | (2006.01) | |
| *B21J 15/02* | (2006.01) | |
| *B21J 15/32* | (2006.01) | |
| *B25J 19/00* | (2006.01) | |
| *B25J 9/16* | (2006.01) | |
| *B25J 11/00* | (2006.01) | |
| *B23Q 16/00* | (2006.01) | |
| *B23P 19/10* | (2006.01) | |
| *B25B 1/04* | (2006.01) | |
| *B23P 19/04* | (2006.01) | |
| *B23P 19/00* | (2006.01) | |
| *F16B 31/02* | (2006.01) | |

(52) U.S. Cl.
CPC ............. *B23P 19/005* (2013.01); *B25B 21/002* (2013.01); *B25B 23/1415* (2013.01); *B25J 11/005* (2013.01); *B25J 15/0019* (2013.01); *B64F 5/0009* (2013.01); *B23P 19/001* (2013.01); *B23P 19/006* (2013.01); *B23P 19/04* (2013.01); *B23P 19/10* (2013.01); *B23Q 16/00* (2013.01); *B25B 1/04* (2013.01); *B25J 9/1697* (2013.01); *B25J 11/007* (2013.01); *B25J 19/0058* (2013.01); *F16B 31/021* (2013.01); *G05B 2219/45088* (2013.01); *G05B 2219/45126* (2013.01); *Y10T 29/49622* (2015.01); *Y10T 29/49908* (2015.01); *Y10T 29/49948* (2015.01); *Y10T 29/49956* (2015.01); *Y10T 29/53078* (2015.01); *Y10T 29/53091* (2015.01); *Y10T 29/53096* (2015.01); *Y10T 29/53774* (2015.01); *Y10T 29/53991* (2015.01)

(56) References Cited

U.S. PATENT DOCUMENTS

| | | | | |
|---|---|---|---|---|
| 4,819,522 | A * | 4/1989 | Stinson | 81/113 |
| 4,885,836 | A * | 12/1989 | Bonomi et al. | 29/524.1 |
| 5,577,633 | A * | 11/1996 | Jones | 221/1 |
| 6,253,448 | B1 * | 7/2001 | Zieve et al. | 29/709 |
| 6,446,330 | B2 * | 9/2002 | Zieve et al. | 29/788 |
| 8,286,323 | B2 * | 10/2012 | Toh et al. | 29/525.01 |
| 8,468,671 | B2 * | 6/2013 | Tomchick | 29/243.53 |
| 8,479,382 | B2 * | 7/2013 | Sarh | 29/809 |

* cited by examiner

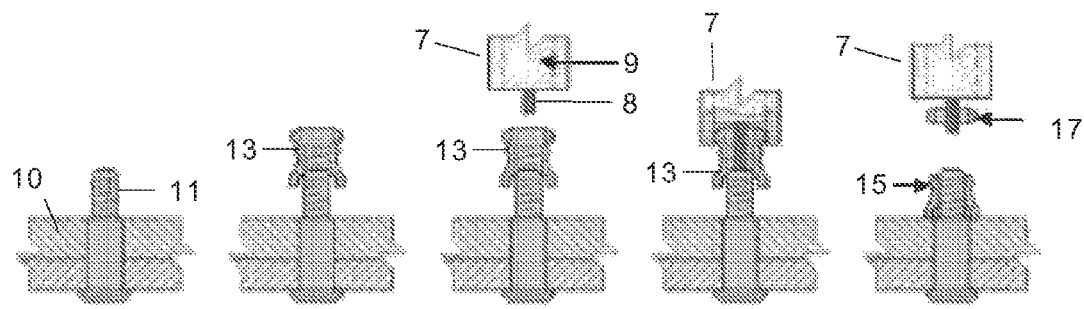
FIG. 1a Prior Art
FIG. 1b Prior Art
FIG. 1c Prior Art
FIG. 1d Prior Art
FIG. 1e Prior Art
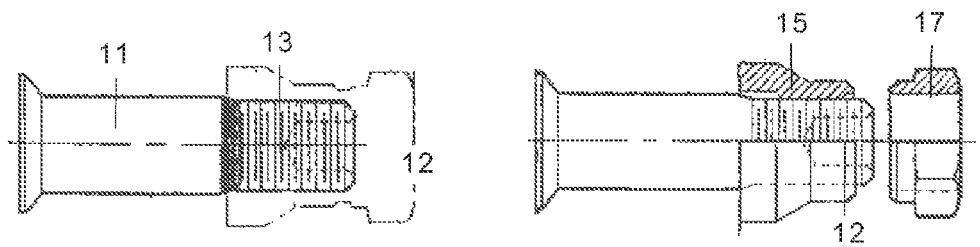
FIG. 2a Prior Art
FIG. 2b Prior Art
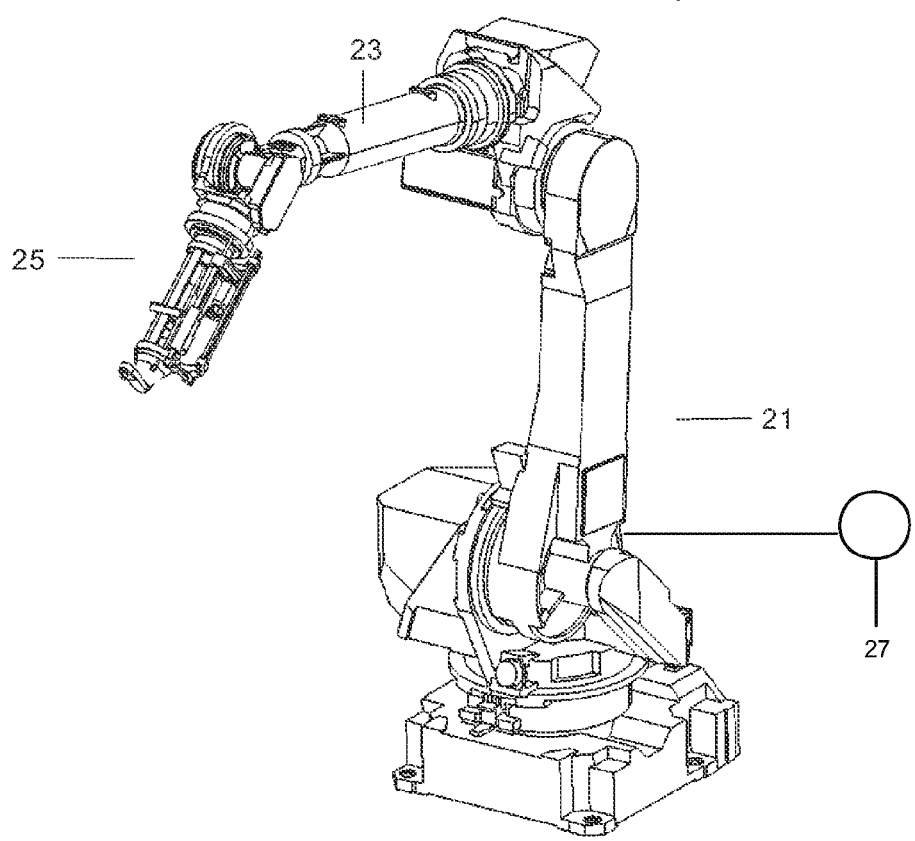
FIG. 3

RIVETING DEVICE FOR AIRCRAFT FUSELAGES

CROSS-REFERENCES TO RELATED APPLICATIONS

This application claims the benefit of the European patent application No. 12382056.5 filed on Feb. 20, 2012, the entire disclosures of which are incorporated herein by way of reference.

FIELD OF THE INVENTION

The present invention refers to riveting devices and methods for joining components of structures such as aircraft fuselages and, more particularly, to riveting devices and methods for the automatic installation of the collars on the pins in aircraft fuselages made of composite materials.

BACKGROUND OF THE INVENTION

Among the joining methods used to assemble aircraft structures made of composite materials, preferably Carbon Fiber Reinforced Plastic (CFRP), metallic materials or hybrid combinations of them, are well known riveting methods using short threaded rivets with a sliding adjustment such as the HI-LITE rivets manufactured by Hi Shear Corporation.

These rivets, developed exclusively for the aerospace industry, consist of a threaded pin whose head may be protruding or countersunk and a nut or collar which limits the torque applied by breaking a part of it. In the case of closed structures such as fuselages, which must use a large number of rivets to join the fuselage skin with the various internal stiffening elements (frames, stringers, beams), the installation of collars on pins previously inserted from the outside of the fuselage is usually carried out manually with the aid of a pneumatic tool.

The riveting process includes the following basic steps:

Operators are distributed in random areas for working in parallel. The order of collar installation is not important.

Each operator is provided with the collars that he will need (pre-deposited in separate boxes for each reference).

For each specific pin, the corresponding collar is selected, a manual threading operation of the collar on the pin with a ½-¾ turn is done and, using a pneumatic or electric tool, the complete fastening of the collar is done until a part of it breaks.

Finally, the broken part of the collar is manually extracted from the pneumatic or electric tool, with a jolt.

The head of the pneumatic or electric tool is relatively simple and therefore small in size. It consists of a central hexagonal pin which remains in a fixed position and blocks the rotation of the pin, and a socket through which it applies torque to the hexagonal head collar. Once it reaches the torque corresponding to the breaking point of the collar employed, the detached body part or surplus remains lodged in the socket. A slight jolt is enough to detach it. This process is laborious and has the disadvantage of being highly labor intensive, increasing the cost of the aircraft manufacture. Additionally the operators sometimes have to adopt non-ergonomic positions for the collar installation operations.

The present invention is directed to solving these problems.

SUMMARY OF THE INVENTION

An object of this invention is to automate the installation of collars on pins in riveting systems of at least two components of a structure, the collars having a first part which is designed to be attached to the pins and a second part to control the torque applied to the collars, separated from the first part by a frangible zone, which is designed to break when the torque reaches a predetermined value, in, particularly, big structures such as aircraft fuselages having low accessibility areas.

In one aspect, these and other objects are achieved by a head of a riveting device comprising: at least a collar installation tool; collar supply means to said collar installation tool; tool actuating means; linear displacement means during the threading operation; withdrawal means of the second part of the collars; control means arranged to automatically perform the installation of collars on pins and after this, the withdrawal of the second part of the collars, using tools and collars appropriate for each of the pins.

In embodiments of the invention the head also comprises artificial vision means adapted to perform recognition of the position and orientation of the pins so that the head can be properly positioned with respect to the pins. Hereby it is achieved a head having a useful pin recognition capability when their position is not available.

In embodiments of the invention the head also comprises cleaning means for removing any sealing material remaining on the pins. Hereby it is achieved a head capable of performing the cleaning of the pins before the installation of the collars on the pins.

In embodiments of the invention said tool actuating means comprise an electric or pneumatic motor. Hereby it is achieved a head with tool actuating means with a similar performance to the tools used in manual procedures for installing collars on pins.

In embodiments of the invention the head also comprises a vacuum duct connected to the collar installation tool. Hereby it is achieved a head capable of holding a collar which allows an effective installation of the collar on the pin.

In embodiments of the invention the collar supply means and the withdrawal means comprise collar supply ducts connected to collar deposits, a suction duct connected to a reservoir, a movable arm between the collar installation tool and the collar supply ducts or the suction duct and a vacuum duct for the movable arm. Hereby it is achieved a head able to efficiently feed the collar installation tool with the collars needed for their installation on the pins and to efficiently withdraw the detached parts of the collars.

In embodiments of the invention the actuation means of said movable arm are a rotatory actuator and a linear actuator. Hereby it is achieved a head with a suitable arm for providing collars to the collar installation tool and to withdraw from the collar installation tool the detached parts of the collars.

In embodiments of the invention the collar installation tool is selected among a straight tool, having its actuating terminal in the same axis of the tool actuating means, and an angled tool, having its actuating terminal in a displaced axis with respect to the axis of the tool actuating means, and the head is arranged so that said movable arm can reach the terminals of both collar installation tools. Hereby it is achieved a head with two interchangeable tools, where the straight tool will be used to install collars on easily accessible pins and where the angled tool will be used to install collars on pins inaccessible to the straight tool.

In embodiments of the invention the head is configured with at least two interchangeable assemblies of one collar installation tool and one tool actuating means adapted to different sizes of collars. Hereby it is achieved a modular head for effectively managing a wide range of collar references.

In another aspect, the above mentioned objects are achieved with a robot with an articulated arm having as end-effector the above-mentioned head and control means arranged for placing the end-effector in a suitable position for reaching the pins with the collar installation tool.

In embodiments of the invention, said robot is used in a section of an aircraft fuselage. Hereby it is achieved a suitable device for installing automatically collars on pins in a structure where the access to the pins is not easy.

In embodiments of the invention, the components of the structure to be riveted are made of composite materials and the pins are inserted in the structure without interference. Hereby it is achieved a suitable device for automatically installing collars on pins where the axis of the pins may have certain deviation with respect to a perpendicular axis to the fuselage skin.

In another aspect, the above mentioned objects are achieved with a method comprising the following steps: a) inserting said pins in said aircraft fuselage from the outside; b) installing said collars on the pins from the inside using the above mentioned robot.

In embodiments of the method the step a) is performed using an automated device for inserting the pins that can provide the coordinates of their locations and in step b) said coordinates are used by the control means of said robot for placing the head in a suitable position for reaching the pins with the collar installation tool.

Other desirable features and characteristics of the invention will become apparent from the subsequent detailed description of the invention and the appended claims, in relation with the enclosed drawings.

BRIEF DESCRIPTION OF THE DRAWINGS

FIGS. 1a-1e schematically show the sequence of operations for manually installing a collar on a pin using HI-LITE type rivets.

FIGS. 2a and 2b show, respectively, a threaded collar on a pin and a collar installed on a pin after the removal of the detached part.

FIG. 3 is a perspective view of a robot for an automated installation of collars according to the present invention.

DETAILED DESCRIPTION OF THE PREFERRED EMBODIMENTS

Figure 4:
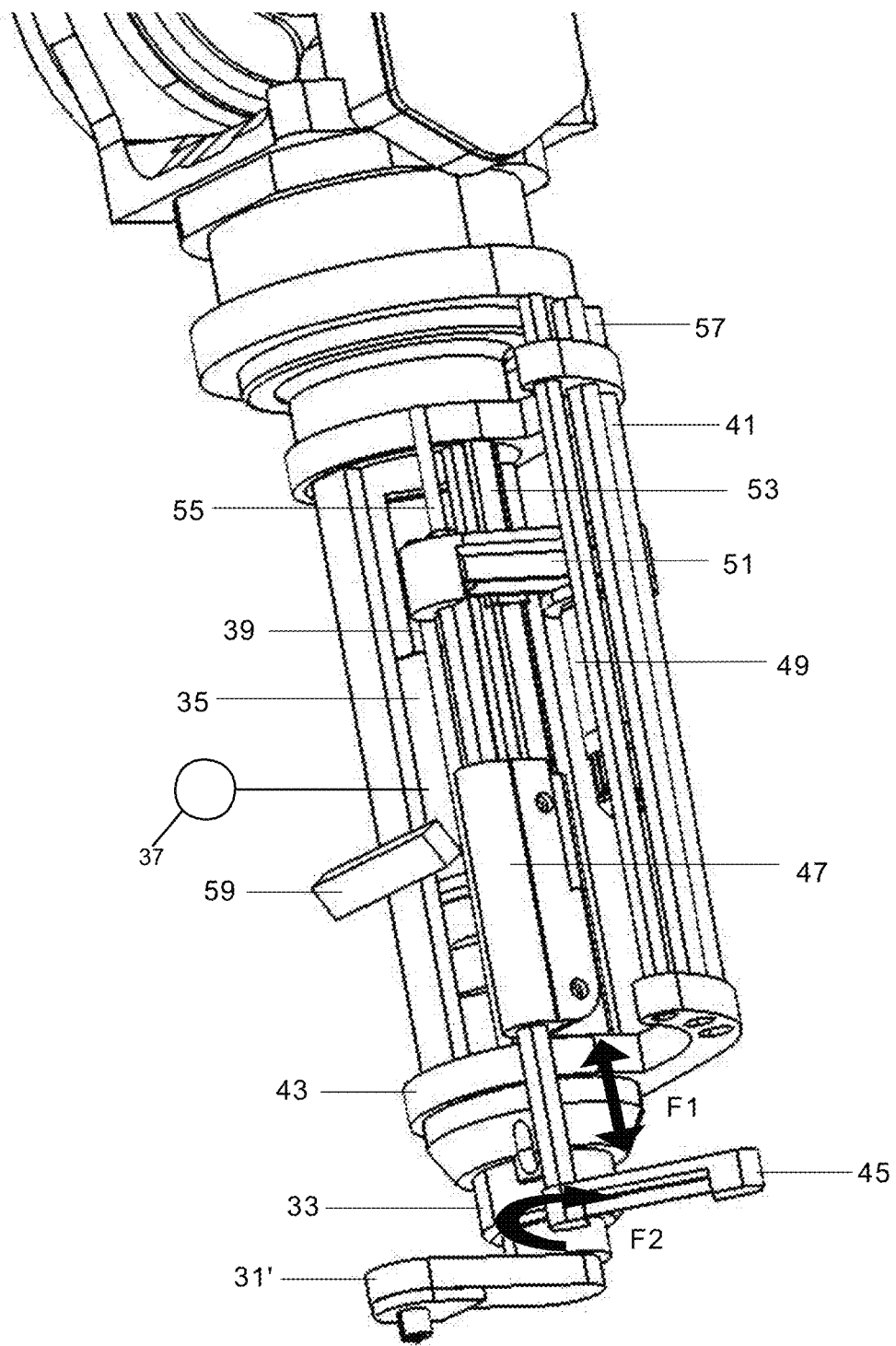
FIG. 4 is a detailed view of the end-effector of said robot.

FIG. 1 schematically shows the typical steps of the manual process of installing a collar 13 on a pin 11 of a HI-LITE type rivet in a structure 10.

In the first step (FIG. 1a) the pin 11 is inserted in the structure 10 in a sliding manner, i.e. without interference.

In the second step (FIG. 1b) a first thread (of small size) of the collar 13 on the pin 11 is done manually.

In the third step (FIG. 1c) a tool 7 (similar to an Allen wrench) is prepared for carrying out the final step of the installation of the collar 13 on the pin 11. The tool comprises an actuating terminal comprising a central hexagonal bar 8 which remains fixed and locks the rotation of the pin 11 cooperating with a hole 12 at the end of the pin 11 and a socket 9 for applying a torque on the head of the collar 13 for threading it on the pin 11.

In the fourth step (FIG. 1d) the process of applying torque to the collar 13 using the above-mentioned tool 7 is illustrated.

In the fifth step (FIG. 1e) the final result is shown. After reaching a predetermined torque, the second part 17 of the collar 13 is broken and remains lodged in the tool 7. A slight jolt is enough to detach it.

FIGS. 2a and 2b illustrate in detail the final state of, respectively, the fourth and fifth steps.

The aim of the present invention focuses on automating the installation operations of the collars on the pins in a structure such as a section of the fuselage of an aircraft to be carried out during its assembly process which is usually done using mounting platforms.

The pins can be inserted into the fuselage manually or by an automated system that can be coordinated with the automated installation of the collars. In both cases the pin should be inserted in holes perpendicular to the surface of the fuselage to ensure proper pin orientation.

In an embodiment of the invention, the above-mentioned automation is achieved by a robot 21 (see FIG. 3) with an articulated arm 23 at whose end stands as end-effector a head 25 with means for installing collars on pins previously inserted in the fuselage that is adapted to move along the fuselage mounting platforms to properly position the end-effector 25 in relation to each pin to proceed with the collar installation. A control device 27 is provided to operate the robot 21.

We will now describe in more detail the main components of the device.

The Robot

The robot 21 is arranged as a mobile device on the mounting platform of the fuselage so that it can approach the target area for installing a collar 13 on a pin 11. After reaching the desired position, the robot 21 drives the arm 23 to align its end-effector 25 with the pin 11 where a collar 13 shall be installed.

The End-Effector

In the embodiment of the invention illustrated in FIG. 4 the components of the end-effector 25 are the following:

A tool for installing a collar attached to a coupling interface 33. Shown in

FIG. 4 is an angled tool 31', but a straight tool 31 can be also used as we shall see later on, joined to said coupling interface 33. The actuating terminal of said tools 31, 31' has a similar configuration to the actuation terminal of the above-mentioned tool 7 (a central hexagonal bar 8 for blocking the rotation of the pin 11 and a socket 9 for applying a torque to the collar 13).

An electric or pneumatic motor 35 as actuating means of the tool 31, 31' to rotate the socket 9.

A vacuum duct 39 connected to the tool 31, 31' that holds the collar on the tool 31, 31'.

Means for supplying collars 13 to the tool 31, 31' comprising one or more supply ducts 41 (depending on the number of collar references being used), a distribution flange 43 of the collar supply ducts 41, an L-shaped arm 45 for feeding the tools 31, 31' with collars, a linear actuator 47 for the L-shaped arm 45, a rotatory actuator for the L-shaped arm 45 comprising a spindle motor 49, a transmission belt 51 and a guiding bar 53, and a vacuum duct 55 for the L-shaped arm 45.

Linear displacement means during the threading operation (not shown separately in FIG. 4). These means can move either the tool 31, 31' or the assembly motor 35—tool 31, 31 or, even, the whole end-effector 25. In the latter case the robot 21 will be used as actuator. In the other cases electric actuators, pneumatic actuators or springs could be used as actuators.

Withdrawal means for the removal of the second part 17 of the collar 13 comprising a suction duct 57.

Artificial vision means 59.

The operation of this end-effector 25 is schematically described as follows. Once the pin 11 where a collar 13 shall be installed is located using, if needed, the artificial vision means 59 and once the end-effector 25 is properly positioned with respect to the pin 11, the collar supply means 41, 43 places a suitable collar 13 for the pin 11 in the arm 45 which carries the collar 13 by combining a linear movement (arrow F1 down) and a rotational movement (arrow F2) to the tool 31' to which is transferred by the effect of a vacuum. Hereafter the tool 31' installs the collar 13 on the pin 11 and the removal means 57 carry the second part 17 of the collar 13 which breaks away during the final stage of the installation to a reservoir of leftover material.

The electric or pneumatic motor 35 for actuating the tool 31, 31' is common for the different types of tool 31, 31' (straight or angled) and for the different sizes of collars 13. It can have a control device 37 arranged to adapt its performance to the size of each collar 13. The coupling interface 33 allows pneumatic and mechanical coupling between the electric motor 35 and the tool 31, 31'.

The choice of a straight tool 31 or an angled tool 31' depends of course on the location of the pin 11.

The end-effector 25 is coaxial to the axis of rotation of the last degree of freedom of the robot 21.

The robot 21 also comprises a shelf (usually named automatic tooling changer) attached to it with an appropriate tooling for storing the different types of tools used, the different collars to be used by said collar supply device and the excess material.

Figure 5A:
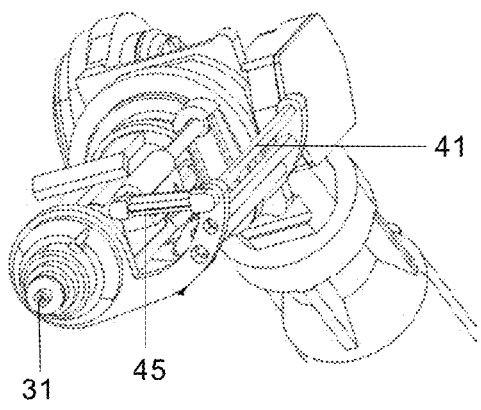
FIGS. 5a and 5b illustrate the sequence of operations to feed a straight tool of the end-effector with a collar.
Figure 5B:
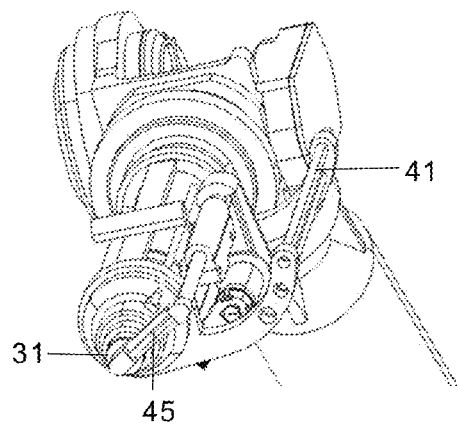

FIGS. 5a and 5b show the sequence of feeding a collar 13 to a straight tool 31. In FIG. 5a it can be seen how the arm 45 is taking a collar 13 from the collar supply duct 41 and in FIG. 5b it can be seen how the collar 13 is transferred from the arm 45 to the tool 31.

Figure 6A:
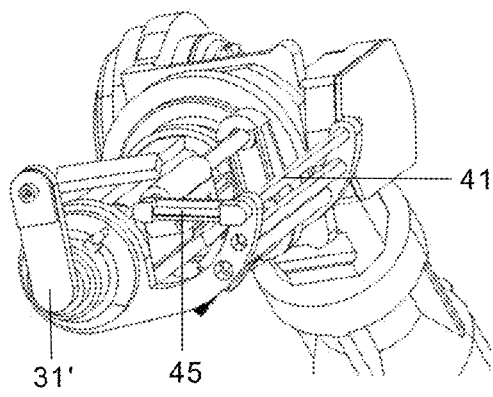
FIGS. 6a and 6b illustrate the sequence of operations to feed an angled tool of the end-effector with a collar.
Figure 6B:
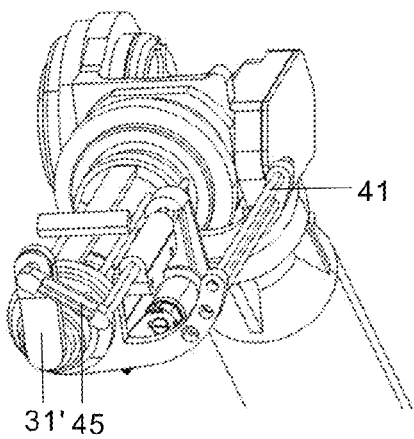
Figure 7:
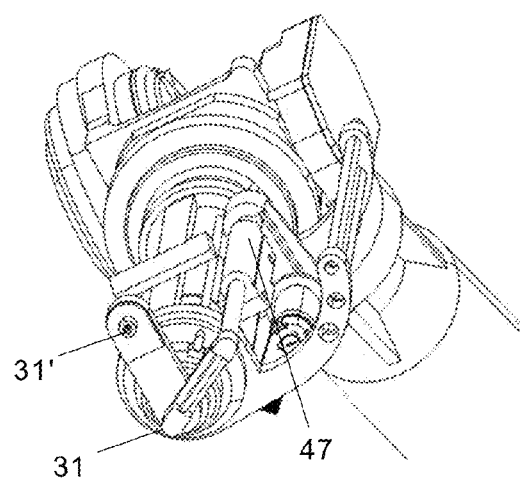
FIG. 7 shows an end-effector that can be configured with a straight tool or with an angled tool.

FIGS. 6a and 6b show the sequence of feeding a collar to an angled tool 31'.

The interchangeability between straight and angled tools 31, 31' requires that the axis of the straight tool 31 and the axis of the angled tool 31' be within the turning radius of the arm 45.

The Control of the Displacement of the Robot

Ideally the fuselage must be prepared in a mounting platform so that the robot 21 can use both the information available in the CAD system used for the design of the fuselage regarding its interior geometry and the location of the pins previously inserted either by a manual or an automated system (with a greater or lesser margin of error with respect to the location specified in the design).

From that information and the information provided by its sensor system, the movements of the robot 21 can be programmed in the control 27 to optimize the execution of the installation operation of the collars 13 on the pins 11.

Although the present invention has been described in connection with various embodiments, it will be appreciated from the specification that various combinations of elements, variations or improvements therein may be made, and are within the scope of the invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A head of a device for riveting together at least two components of a structure and for installing collars on pins previously inserted in the structure, said collars having a first part which is designed to be threadingly attached to the pins and a second part separable from the first part by a frangible zone which is designed to break when a torque applied to the collars reaches a predetermined value, the head comprising:
   at least one collar installation tool;
   a collar supply comprising a plurality of collars, the collar supply retained with the collar installation tool and arranged to supply a collar from the supply of collars to said collar installation tool;
   an actuating device arranged to rotate at least a portion of the collar installation tool;
   a linear displacement device arranged to linearly move the collar installation tool during an operation of threading said collars on said pins;
   a withdrawal device arranged to withdraw the second part of the collars after they have separated from the first part of the collars;
   a control arrangement configured to automatically perform the installation of collars on pins and the withdrawal of the second part of the collars after the installation of collars on pins, using tools and collars appropriately sized and shaped for the pins.

2. The head of a riveting device according to claim 1, further comprising:
   collar supply ducts connected to collar deposits;
   a suction duct connected to a reservoir in which a plurality of second parts separated from a corresponding plurality of first parts is stored;
   a movable arm between the collar installation tool and the collar supply ducts or the suction duct; and
   a vacuum duct connected to the movable arm.

3. The head of a riveting device according to claim 2, including an actuation device for said movable arm comprising a rotary actuator and a linear actuator.

4. The head of a riveting device according to claim 2, wherein:
   said collar installation tool being one of a straight tool, having its actuating terminal arranged along an axis common with the tool actuating device, and an angled tool having its actuating terminal in a displaced axis with respect to an axis along which said tool actuating device is arranged;
   the head being arranged so that said movable arm can reach actuating terminals of the straight tool and the angled tool.

5. The head of a riveting device according to claim 2, wherein the head is configured with at least two predefined interchangeable assemblies of one collar installation tool and one tool actuating device adapted to different size ranges of collars.

6. The head of a riveting device according to claim 1, further comprising artificial vision means adapted to perform recognition of the position and orientation of pins so that the head can be properly positioned with respect to the pins.

7. The head of a riveting device according to claim 1, further comprising a cleaning device arranged to remove any sealant material remaining on the pins.

8. The head of a riveting device according to claim 1, further comprising a vacuum duct connected to the collar installation tool.

9. The head of a riveting device according to claim 1, wherein said tool actuating device is one of an electric motor and a pneumatic motor.

10. A robot for riveting at least two components of a structure for installing collars on pins previously inserted in the structure, said collars having a first part which is designed to be attached to the pins and a second part separable from the first part by a frangible zone which is designed to break when a torque applied to the collars reaches a predetermined value, comprising:
- an articulated arm having as an end-effector;
- a head; and
- a control device arranged to place the end-effector in a suitable position for reaching the pins with the collar installation tool, wherein the head comprises:
  - at least one collar installation tool;
  - a collar supply arranged to supply collars to said collar installation tool;
  - an actuating device arranged to rotate at least a portion of the collar installation tool;
  - a linear displacement device arranged to linearly move the collar installation tool during an operation of threading said collars on said pins;
  - a withdrawal device arranged to withdraw the second part of the collars after they have separated from the first part of the collars; and
  - a control arrangement configured to automatically perform the installation of collars on pins and after the installation of collars on pins the withdrawal of the second part of the collars, using tools and collars appropriately sized and shaped for the pins.

11. The robot according to claim 10, wherein said structure is a section of an aircraft fuselage.

12. The robot according to claim 10, wherein the components of the structure being riveted are made of composite materials and said pins are inserted in the structure without interference.

* * * * *